United States Patent
Peng (10) Patent No.: US 10,770,098 B1
(45) Date of Patent: Sep. 8, 2020

(54) HEAT-ASSISTED MAGNETIC RECORDING HEAD WITH NEAR-FIELD TRANSDUCER HAVING FIRST AND SECOND SURFACE-PLASMONIC PLATES

(71) Applicant: Seagate Technology LLC, Cupertino, CA (US)

(72) Inventor: Chubing Peng, Eden Prairie, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 16/591,999

(22) Filed: Oct. 3, 2019

Related U.S. Application Data (60) Provisional application No. 62/742,616, filed on Oct. 8, 2018.

(51) Int. Cl.
| | | |
|---|---|---|
| *G11B 5/31* | (2006.01) | |
| *G11B 5/60* | (2006.01) | |
| *G11B 5/48* | (2006.01) | |
| *G11B 7/1387* | (2012.01) | |
| *G11B 5/00* | (2006.01) | |

(52) U.S. Cl.
CPC ............ *G11B 5/314* (2013.01); *G11B 5/3116* (2013.01); *G11B 5/3133* (2013.01); *G11B 5/4866* (2013.01); *G11B 5/6088* (2013.01); *G11B 7/1387* (2013.01); *G11B 5/3109* (2013.01); *G11B 2005/0021* (2013.01)

(58) Field of Classification Search
CPC ...... G11B 5/3133; G11B 5/314; G11B 5/3109
USPC .......................................... 360/125.3, 125.31
See application file for complete search history.

(56) References Cited

U.S. PATENT DOCUMENTS

| 8,169,861 | B1* | 5/2012 | Komura | G11B 5/3116 |
| | | | | 369/112.27 |
| 9,472,230 | B1* | 10/2016 | Sasaki | G11B 5/012 |
| 9,741,377 | B1* | 8/2017 | Sasaki | G11B 5/1272 |
| 10,121,496 | B1* | 11/2018 | Peng | G11B 5/6088 |
| 10,134,430 | B1* | 11/2018 | Sasaki | G11B 5/3116 |
| 2015/0124575 | A1* | 5/2015 | Sasaki | G11B 5/3133 |
| | | | | 369/13.33 |
| 2015/0255096 | A1* | 9/2015 | Sasaki | G11B 5/4866 |
| | | | | 369/13.33 |
| 2015/0262593 | A1* | 9/2015 | Sasaki | G11B 5/1278 |
| | | | | 369/13.17 |
| 2015/0325261 | A1* | 11/2015 | Yang | G11B 5/3133 |
| | | | | 369/13.33 |
| 2016/0351209 | A1* | 12/2016 | Chen | G11B 5/3116 |

(Continued)

*Primary Examiner* — Jefferson A Evans
(74) *Attorney, Agent, or Firm* — Mueting Raasch Group (57) ABSTRACT

A write head includes a first surface-plasmonic plate proximate a magnetic pole and recessed from a media-facing surface of the write head. A bottom surface of the first surface-plasmonic plate faces away from the magnetic pole and towards a waveguide core. The first surface-plasmonic plate is formed of a first material having lower-loss in plasmonic coupling than a second material, the second material being more mechanically robust than the first material. A second surface-plasmonic plate is formed of the second material and located on the bottom surface of the first surface-plasmonic plate. A lower edge of the second surface-plasmonic plate extends closer to the media-facing surface than the first surface-plasmonic plate. An upper edge of the second surface-plasmonic plate is slanted in a downtrack direction.

20 Claims, 6 Drawing Sheets

(56) References Cited

U.S. PATENT DOCUMENTS

| | | | |
|---|---|---|---|
| 2017/0221505 A1 | 8/2017 | Staffaroni et al. | |
| 2017/0249958 A1* | 8/2017 | Blaber | G11B 5/187 |
| 2018/0096702 A1* | 4/2018 | Staffaroni | G11B 5/4866 |
| 2018/0211686 A1* | 7/2018 | Nishimura | G11B 5/6088 |
| 2019/0066722 A1* | 2/2019 | Maletzky | G11B 5/3133 |

* cited by examiner

HEAT-ASSISTED MAGNETIC RECORDING HEAD WITH NEAR-FIELD TRANSDUCER HAVING FIRST AND SECOND SURFACE-PLASMONIC PLATES

SUMMARY

This disclosure relates to a heat-assisted magnetic recording head with near-field transducer having first and second surface-plasmonic plates. In one embodiment, a write head includes a waveguide core, a magnetic pole, and a first surface-plasmonic plate proximate the magnetic pole and recessed from a media-facing surface of the write head. A bottom surface of the first surface-plasmonic plate faces away from the magnetic pole and towards the waveguide core. The first surface-plasmonic plate is formed of a first material having lower-loss in plasmonic coupling than a second material, the second material being more mechanically robust than the first material. A second surface-plasmonic plate is formed of the second material and located on the bottom surface of the first surface-plasmonic plate. A lower edge of the second surface-plasmonic plate extends closer to the media-facing surface than the first surface-plasmonic plate. The second surface-plasmonic plate has a peg that extends from the lower edge to the media-facing surface. An upper edge of the second surface-plasmonic plate is slanted in a downtrack direction.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical hotspot in a recording layer, which raises the media temperature locally, reducing the writing magnetic field required for high-density recording. A waveguide delivers light to the near-field transducer and excites the near-field transducer.

Light from a light source, such as an edge-emitting laser diode, is coupled into a HAMR waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The NFT is designed to adapt the light delivery. For example, an NFT with a peg extending from an enlarged portion (e.g., stadium shaped enlarged portion) is designed for excitation by a first-higher order transverse electric waveguide mode, $TE_{10}$. A sharp-ended, elongated peg design is designed for excitation by a fundamental transverse magnetic waveguide mode, $TM_{00}$. Both of these designs may use a heat-sink coupled to an end of the NFT away from the end to draw heat away from the NFT.

Figure 1:
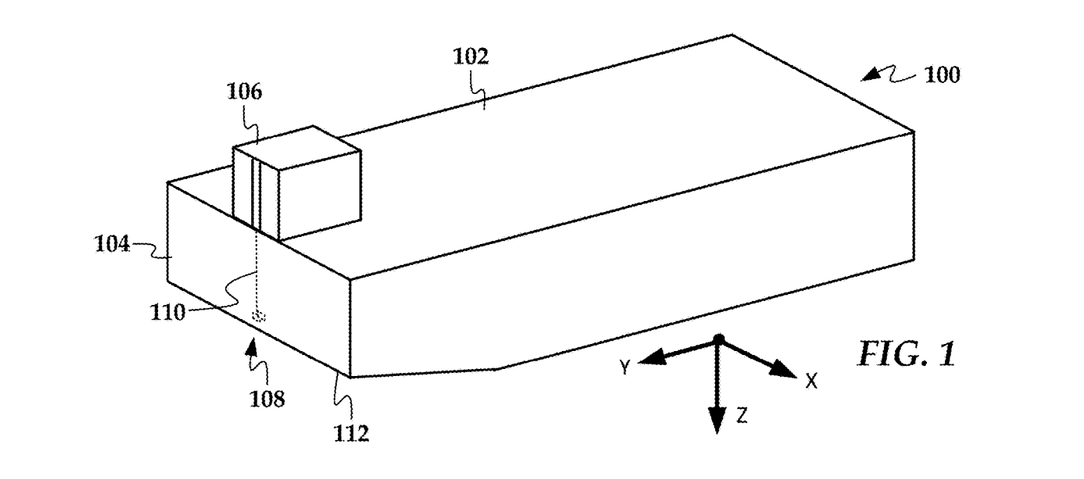
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

For enhanced reliability, current near-field transducers (NFT) may use a hybrid Au—Rh bilayer, for instance. The NFT includes a resonator body made of a low plasmonic loss Au plate, which faces a waveguide core and interacts with a fundamental transverse magnetic mode ($TM_{00}$), or, a first higher order transverse electric mode ($TE_{10}$). Above the Au plate, a mechanically robust Rh-plate with a protruded peg is deposited, generating a hot spot in a recording media for heat-sink assisted magnetic recording (HAMR). Note that Rh has high plasmonic loss and low thermal conductivity. This Au—Rh arrangement maximizes the coupling to the dielectric waveguide and minimizes the interaction of Rh with light. The bottom Au resonator also provides heat-sink to the protruded Rh peg, as the NFT heat-sink above the Rh plate is usually recessed from the Au/Rh plate for high thermal gradient. Surface plasmon polaritons (SPP) are generated at the bottom surface (facing to the waveguide core) of the Au resonator if $TM_{00}$ mode excitation or near the bottom periphery of the side of the Au resonator if $TE_{10}$ mode excitation. However, this SPP in either case does not efficiently couple to the Rh peg. To enhance this coupling, the Au resonator (and therefore the Rh plate) is tapered down toward a media-facing surface, pushing the SPP upward to the Rh peg. This narrowing taper has a potential rise of Au recess and void from media facing surface, a concern for reliability.

An alternative choice is to have a Rh plate/peg face the waveguide core, interacting with a waveguide mode directly. This prevents the above described addition charges transfer path from to Au resonator to Rh peg. However, due to its high loss and low quality (Q)-factor of Rh material, the NFT efficiency is usually low and the light-induced temperature rise is high. U.S. Pat. No. 8,699,307 filed in Mar. 7, 2013, describes a method to enhance the excitation efficiency of plate-like near-field transducer by disposing an elongated ridge of plasmonic material disposed on a surface plasmonic (SP) plate. The ridge has a cross section smaller than the top SP plate, resulting in a short ridge. If the ridge uses Rh material, however, the low Q-factor and small ridge cross section lead to a poor NFT efficiency and high temperature rise at the peg tip.

This disclosure is directed to a near-field transducer with a mechanically robust but high loss plasmonic material directly facing a waveguide core. This robust plasmonic plate with a protruded peg is attached on the bottom of a low-loss plasmonic plate, has a top edge slanted along down-track direction at the start, and much shorter than the low-loss plasmonic plate. The low-loss plasmonic plate is recessed from media facing surface. The NFT does not have a low-loss plasmonic plate underneath and therefore, no potential risk of recess or void. The NFT has an enhanced efficiency and only a small penalty (~+30K) in the temperature rise from prior designs with a low-loss plasmonic resonator.

Figure 2:
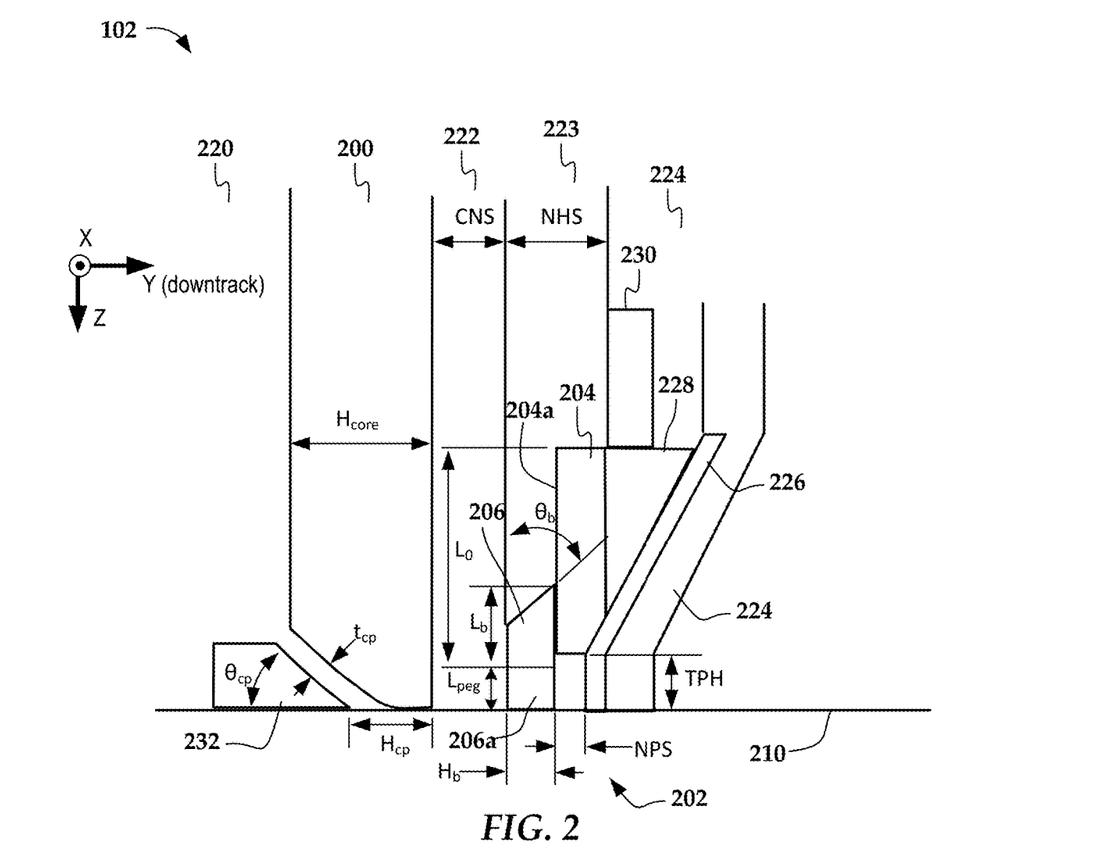
FIGS. 2 and 3 are cross-sectional views of a write transducer according to an example embodiment.
Figure 3:
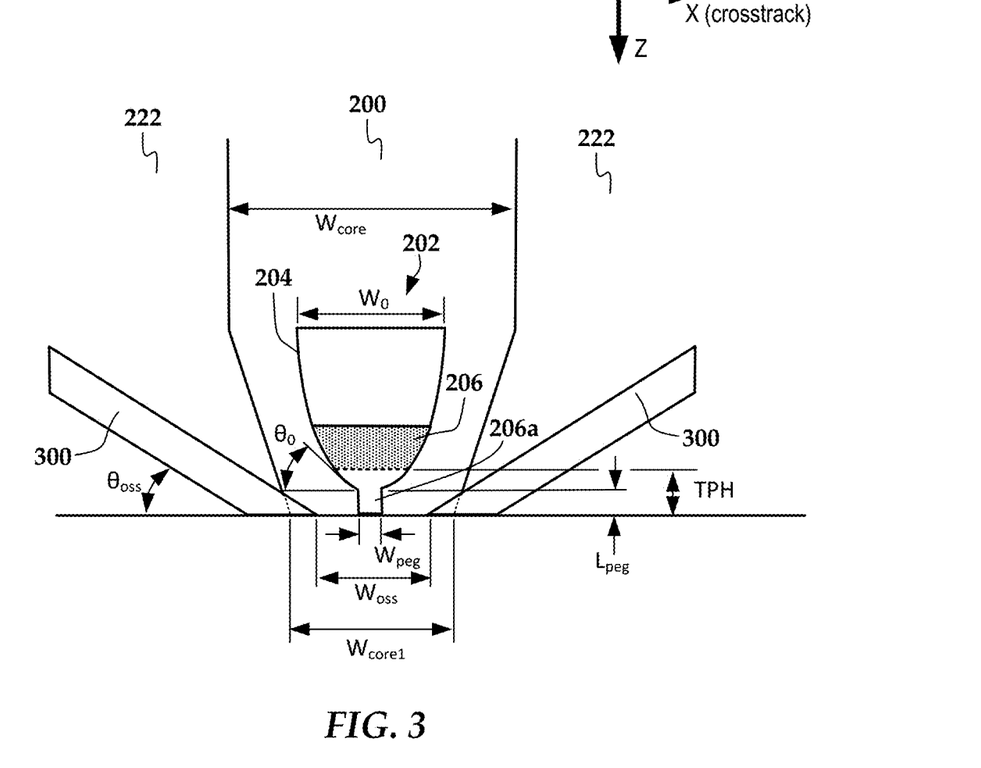

In FIGS. 2 and 3, cross-sectional views show details of a recording according to an example embodiment. Light delivery uses a three-dimensional dielectric waveguide with a fundamental transverse magnetic mode ($TM_{00}$) propagating along the waveguide core 200. The core 200 is surrounded by bottom cladding layer 220 and multiple top layers 222-224. The waveguide delivers light to an NFT 202 near a media-facing surface 210. A write pole 224 has a tip near the NFT 210 and is separated from the NFT 210 by a diffusion barrier 226 and a heat sink 228, the latter coupled to a heat-spreading plate 230.

The NFT 202 includes a first surface plasmonic (SP) plate 204 made of a low-loss plasmonic material, such as Au, Au-alloy, Ag, Cu, recessed from media-facing surface 210 by the amount of TPH, and a mechanically robust second SP plate 206, such as Rh, Ir, Pt, and Pd, to the media-facing surface. This stacked configuration provides good reliability. The second SP plate 206 is mechanically robust and therefore protruded with a peg 206a to the media-facing surface 210. Although both SP plates 204, 206 are narrowed toward the media-facing surface 210, having wide width, for instance, $W_0$ for the first SP plate 204, to a narrow end, for instance, $W_{peg}$ for the second SP plate 206. The first SP plate 204 will be truncated and is recessed from the media-facing surface by TPH ($>L_{peg}$, see FIG. 2). This reduces the chance of further recess during operation.

The second SP plate 206 usually has high plasmonic loss, low Q-factor, and low thermal conductivity. Light absorption in the NFT raises the local temperature. To maximize the heat transfer from the second SP plate 206 to 204, it is preferred that overlapping part of the second SP plate 206 follows the in-plane crosstrack edge shape of corresponding overlapping part of the first plate (see the shaded portion in FIG. 3 which indicates the overlapping portions). Also, it is preferred to have a slow narrowing, or a small $\theta_0$, see FIG. 3, in the second SP plate 206. The first SP plate 204, on one hand, couples light from the dielectric waveguide for NFT efficiency, it also provides heat-sink to the second SP plate 206 as well as heat-sink path to the magnetic pole 224.

Evanescent coupling from the dielectric waveguide to the near-field transducer 202 generates surface-plasmon polariton (SPP) at the bottom surfaces of both SP plates 204, 206 (see, e.g., bottom surface 204a of the first plate 204 shown in FIG. 2). The first SP plate 204 is much longer than the second SP plate 206, $L_0 \gg L_b$. It has a high Q-factor, efficiently coupled to the dielectric waveguide. The SPP generated from the first SP plate 204 propagates to the second SP plate 206 through a slanted start in the second SP plate 206. A shallow slant angle ($\theta_b$) mitigates the SPP scattering and reflection loss. The length ($L_b$) of second SP plate 206 is chosen to be as short as possible and both SP plates are phase-matched for optimal efficiency.

A funnel coupler 232 may be used to improve the NFT performance (thermal gradient, adjacent track erasure ATE and efficiency) by squeezing light toward the NFT, similar to the functioning of horn antennas at radio frequencies. But it also increases the temperature of the NFT 202. The funnel coupler 232 is made of a metallic material, such as a low-loss plasmonic material (such as Au), a high-loss plasmonic material (such as Rh, Ir, Pt), and a lossy refractory metal (such as Ru). The choice of material is based upon the desired reliability, for example. To reduce the light absorption in the metal, a dielectric material of index of refraction lower than the waveguide core material, such as $SiO_2$ and $Al_2O_3$, may be used. Due to the nature of metal and the $TM_{00}$ mode used for NFT excitation, light could be further squeezed to the second SP plate 206 to enhance excitation.

To improve the thermal-gradient further, an optical side shield (OSS) 300 is also implemented in the configuration (see FIG. 3). For the NFT excitation using a $TM_{00}$ (or a $TE_{10}$) mode, the OSS 300 will cut down the mode to the media-facing surface at narrow opening. This will reduce the thermal background from the residual excitation light coupled into a recording media, increasing the thermal gradient. An OSS 300 will not necessarily improve NFT efficiency and also leads to higher temperature rise in the heads. To partially mitigate this negative effort, the waveguide core is tapered to a narrow end, see $W_{core1}$ ($<W_{core}$) in FIG. 3, and a spacer between the OSS and waveguide core is filled with a dielectric material of lower index of refraction than that of the waveguide core, such as $Al_2O_3$, $SiO_2$.

As an example, consider a waveguide formed of a $Ta_2O_5$ core with index of refraction n=2.09, $Al_2O_3$ of n=1.63 as the bottom, side, top cladding and NPS (see FIG. 2), and $SiO_2$ of n=1.46 as the CNS, NHS, and the dielectric spacer between the core and the funnel coupler. The waveguide core 200 is 600-nm wide (along cross-track direction, $W_{core}$) and 400 nm thick (along down-track direction, $H_{core}$). Light wavelength λ=808 nm. The material for the first SP plate 204, NFT heat-sink 228, and heat-spreading layer 230 is gold, n=0.19+j 5.39. The material for the second SP plate 206 and the funnel coupler 232 is Rh, n=2.72+j 6.85. It is assumed that the thermal conductivity is 56 W/m/K for the Rh and 195 W/m/K for Au. The diffusion barrier 226 between the magnetic pole 224 and the NFT heat-sink 22228 uses a 20-nm thick Ir material, n=3.43+j 6.48.

The first SP plate 204 (Au) has a parabolic-like in-plane shape with the dimension: $W_0$=350 nm and $L_0$=0.95 μm. It is 80-nm thick (along down-track direction). second SP plate 206 (Rh) follows the in-plane shape of the Au SP plate, 45-nm ($H_b$) thick, protruding to the media-facing surface 210 with a peg ($W_{peg}$=42 nm, $L_{peg}$=30 nm). For efficient heat-sink to the protruded peg 206a, the end (near the media-facing surface) of the second SP plate 206 is nearly circular, $\theta_0$=10°. Recess of the Au SP plate 204 and heat-sink 228 from the media-facing surface heat-sink is TPH=40 nm+$L_{peg}$.

If a funnel coupler 232 (Rh) is used, the default setting is: $\theta_{cp}$=45°, $H_{cp}$=100 nm and $t_{cp}$=70 nm. The dielectric spacer between the second SP plate 206 and the Ir diffusion barrier is NPS=15 nm, one of the parameters that can significantly affect thermal gradient (TG).

The OSS 300 uses Rh material and its default opening at media-facing surface is $W_{OSS}$=182 nm at $\theta_{oss}$=30°. Note that the OSS 300 is intended to improve thermal gradient (TG). It does not necessarily improve NFT efficiency. The size of the opening $W_{OSS}$ is another parameter for TG. To reduce the light absorption in the OSS, the waveguide core is tapered down to $W_{core1}$=160 nm at the media-facing surface. (The magnitude of $W_{core1}$ is not a critical parameter in performance.)

The media-facing surface 210 is coated with a 1-nm thick $Ta_2O_5$ layer and 1.5-nm thick a diamond-like-carbon layer. The storage media (not shown) is formed of a 5-nm thick carbon-overcoat layer, a 10-nm thick FePt recording layer, a 12-nm thick interlayer, a heat-sink layer, and a soft magnetic layer on a glass substrate. The air gap between head and media is 3 nm.

Figure 4:
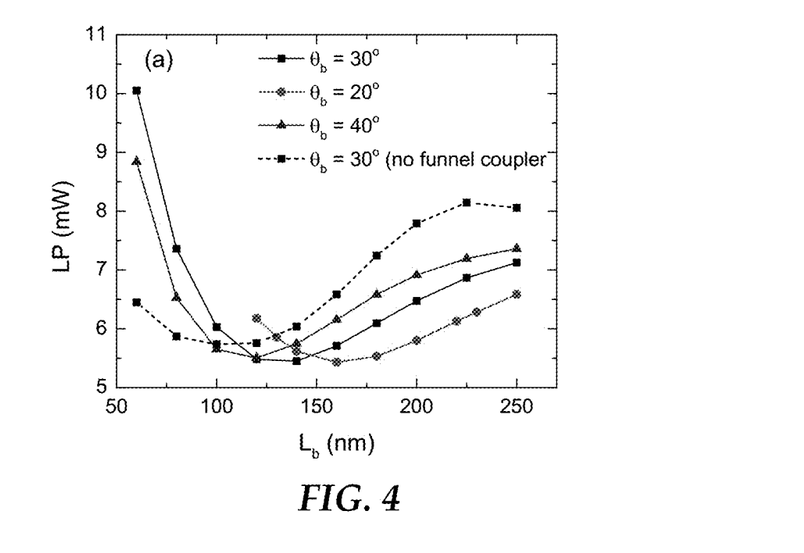
FIGS. 4-10 are graphs showing simulation results of a heat-assisted magnetic recording head according to example embodiments.
Figure 5:
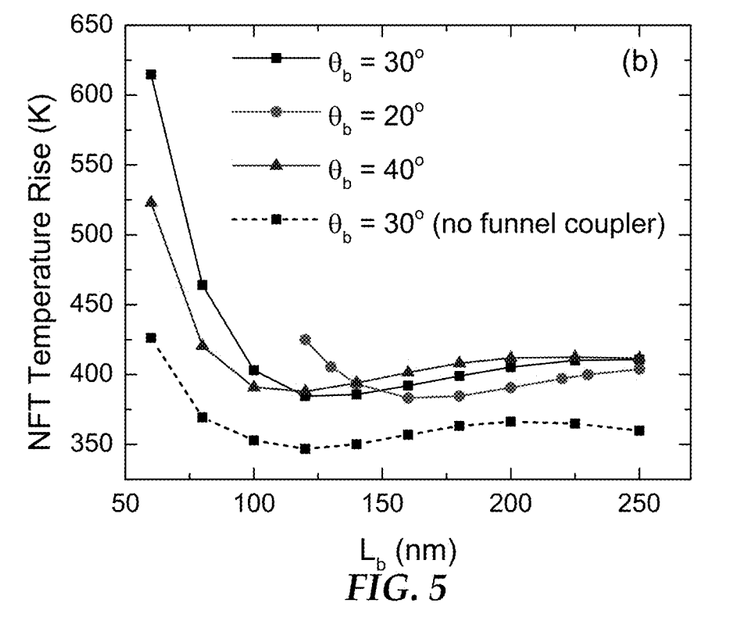
Figure 6:
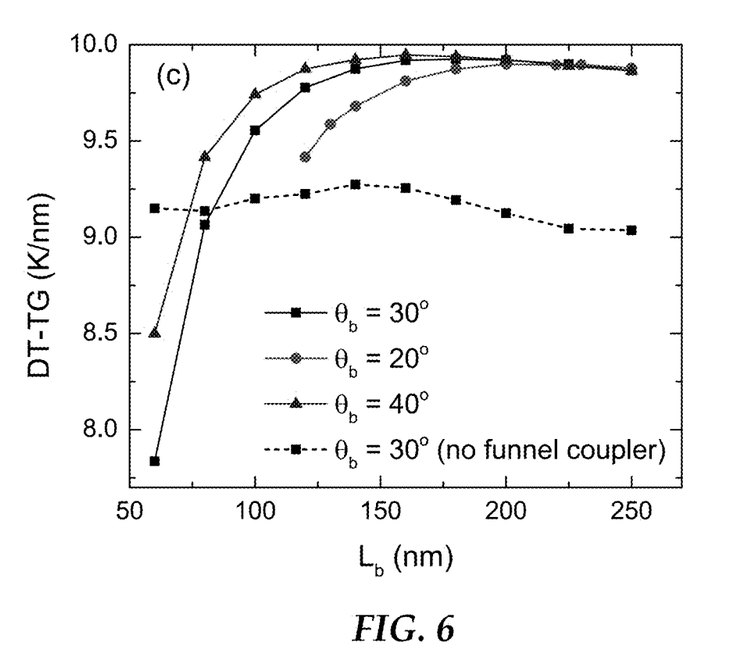
Figure 7:
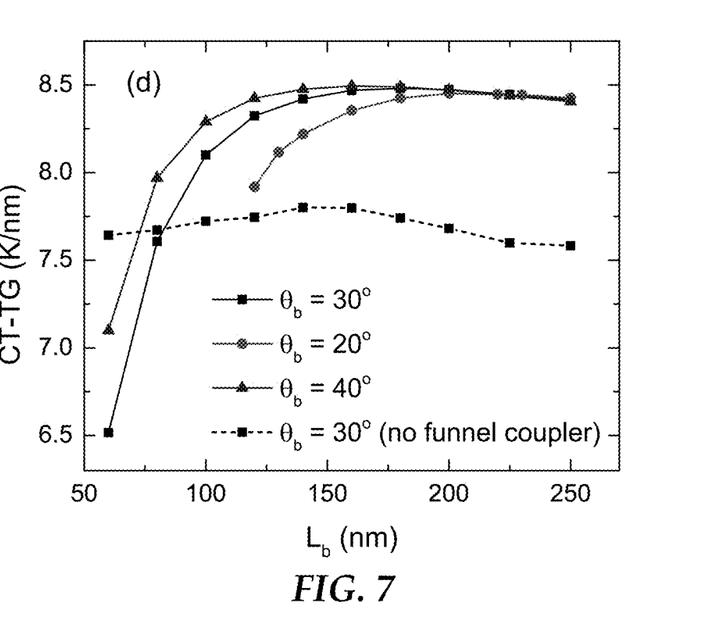

The graphs in FIGS. 4-10 show the longitudinal resonance of the Rh SP plate according to an example embodiment with and without the presence of a funnel coupler. These graphs show longitudinal resonance of a Rh—Au stacked near-field transducer (first and second SP plates 204, 206) versus the length of the Rh plate ($L_b$) at three slant angles ($\theta_b$) if the funnel coupler is integrated or at $\theta_b$=30° if no funnel coupler. In FIG. 4, the graph shows laser power (LP) needed for writing. The graphs in FIGS. 5-7 show temperature rise at the tip of the Rh plate (peg), thermal gradient along down-track (DT-TG) and along cross-track (CT-TG). A 50-nm track pitch (510 kpti) is assumed. Some other parameters assumed in this modeling are: Rh plate-Ir diffusion barrier NPS=15 nm, heat-sink recess TPH=75 nm, OSS opening $W_{oss}$=182 nm, Rh plate thickness $H_b$=45 nm, peg width $W_{peg}$=42 nm and peg length $L_{peg}$=30 nm, core-NFT spacer CNS=15 nm.

Figure 8:
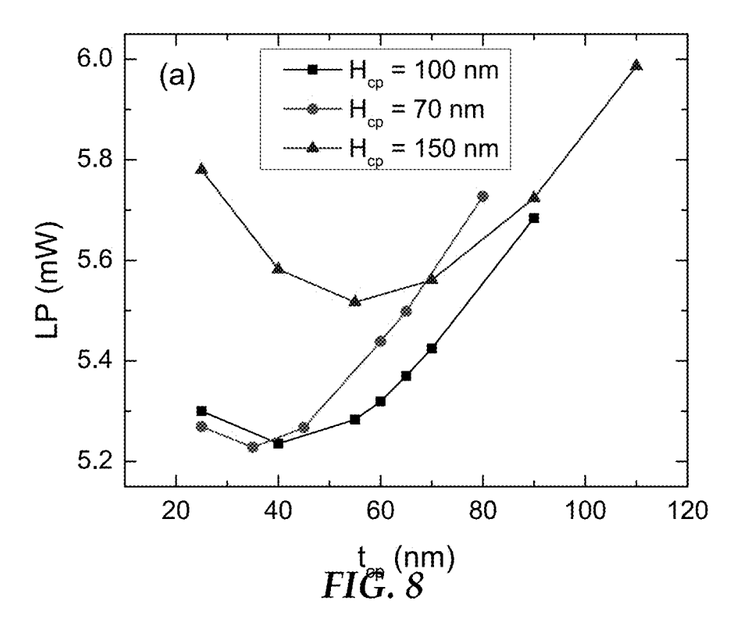
Figure 9:
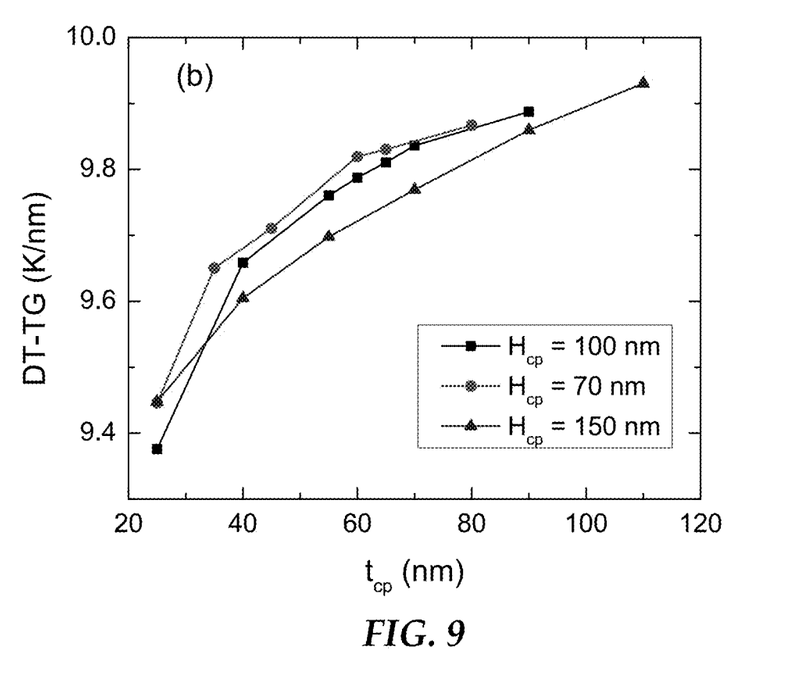
Figure 10:
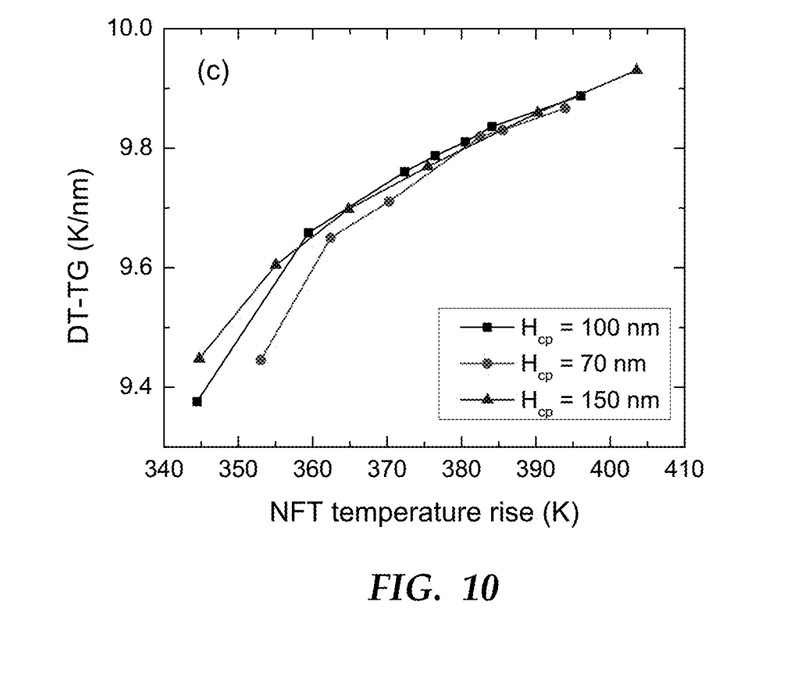

The graphs in FIGS. 8-10, show the effect of the funnel coupler versus the thickness of SiOx layer ($t_{cp}$) at three offsets from core top ($H_{cp}$). Rh is the material for the funnel coupler. The graph in FIG. 8 shows laser power (LP) needed for writing. The graph in FIG. 9 shown thermal gradient along down-track (DT-TG), and the graph in FIG. 10 DT-TG versus temperature rise at the tip of the Rh plate (peg) as the $t_{cp}$ varies. A 50-nm track pitch (510 kpti) is assumed. Some other parameters assumed in this modeling are: Rh plate-Ir diffusion barrier NPS=15 nm, heat-sink recess TPH=75 nm, OSS opening $W_{oss}$=182 nm, Rh plate thickness $H_b$=45 nm, peg width $W_{peg}$=42 nm, peg length $L_{peg}$=30 nm, slant angle $\theta_b$=30°, and length $L_b$=130 nm, core-NFT spacer CNS=15 nm.

It is seen that the optimal slant angle $\theta_b$~30° and the longitudinal dimension ($L_b$) is only ~125 nm, ~1/7 of the Au plate. Such a short Rh plate minimizes its light absorption, rendering high efficiency, low NFT temperature rise, and high thermal gradient. The funnel coupler enhances the NFT efficiency (5% reduction in the required laser power and 5% in ATE) and increases the thermal gradient (+0.64K/nm) from reduced coupling of the residual excitation light to the storage media. But there is a penalty of ~38K in the temperature rise at the peg.

Comparing to the prior NFT design (bottom Au resonator interacting with the dielectric waveguide and Rh layer/peg above the Au resonator), modeling presents a temperature penalty of only ~30K at the tip of peg at the same thermal gradient. (At the same NFT temperature rise, TG is 0.3-0.5 K/nm lower.) This small penalty in temperature is the net result of the reduced heat-sink to the Rh peg and the improved NFT efficiency (~20%).

The NFT temperature could be reduced using a material of low refractive index for the NPS dielectric spacer, for instance, replacing the $Al_2O_3$ material assumed in the modeling with $SiO_2$ reduces 35K. With an E-resonator (e.g., U.S. Pat. No. 10,121,496, filed on Feb. 22, 2018), the NFT temperature could be further reduced by ~30K. With these techniques, this stacked NFT design could have TG ~10K/nm at a peg temperature rise <300K.

In summary, a near-field transducer with mechanically robust but high loss plasmonic materials for enhanced reliability is described. This robust plasmonic plate with a protruded peg is attached on the bottom of a low-loss plasmonic plate, facing to a waveguide core, slanted along down-track direction at the start, and much shorter than the low-loss plasmonic plate. The NFT has an enhanced efficiency and only a small penalty in the light-induced temperature rise (~30K) from prior state of the art with a bottom low-loss plasmonic resonator which has a potential risk of recess and void.

Figure 11:
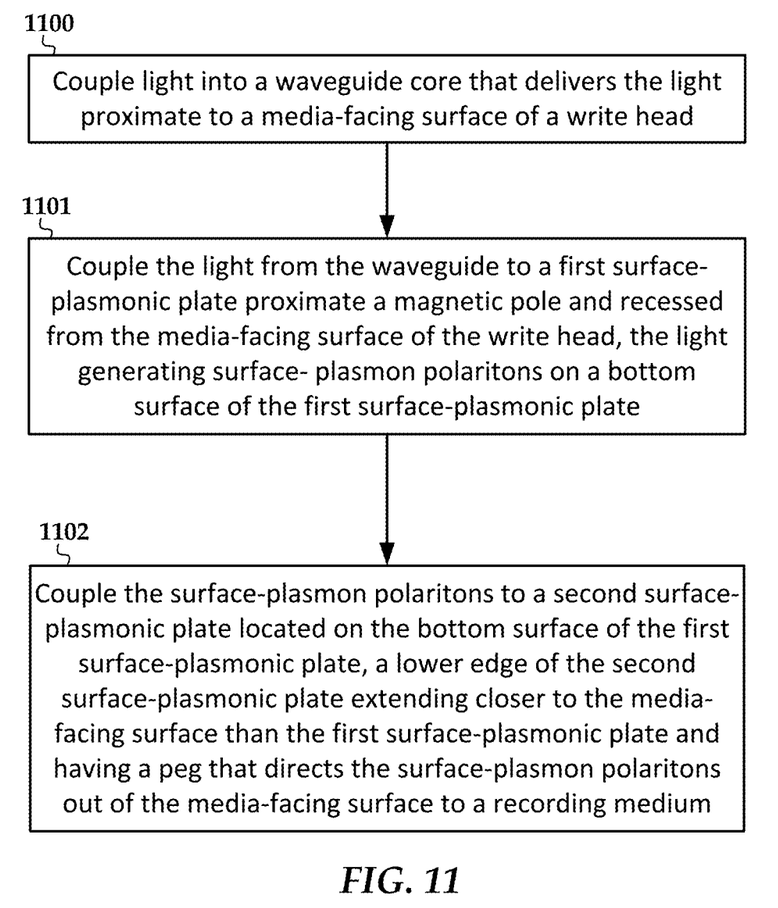
FIG. 11 is a flowchart of a method according to an example embodiment.

In FIG. 11, a flowchart shows a method according to an example embodiment. The method involves coupling 1100 light into a waveguide core that delivers the light proximate to a media-facing surface of a write head. The light is coupled 1101 from the waveguide to a first surface-plasmonic plate proximate a magnetic pole and recessed from the media-facing surface of the write head. The light generates surface-plasmon polaritons on a bottom surface of the first surface-plasmonic plate. The bottom surface faces away from the magnetic pole and towards the waveguide core. The first surface-plasmonic plate is formed of a first material having lower-loss in plasmonic coupling than a second material, the second material being more mechanically robust than the first material.

The surface-plasmon polaritons are coupled 1102 from the bottom surface of the first surface-plasmonic plate to a second surface-plasmonic plate formed of the second material and located on the bottom surface of the first surface-plasmonic plate. A lower edge of the second surface-plasmonic plate extends closer to the media-facing surface than the first surface-plasmonic plate and has a peg that directs the surface-plasmon polaritons out of the media-facing surface towards a recording medium. (Bill: in FIG. 11, please use "polaritons" not "polaritrons in 1101")

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:
1. A write head comprising:
    a waveguide core;
    a magnetic pole;
    a first surface-plasmonic plate proximate the magnetic pole and recessed from a media-facing surface of the write head, a bottom surface of the first surface-plas- monic plate facing away from the magnetic pole and towards the waveguide core, the first surface-plasmonic plate formed of a first material having lower-loss in plasmonic coupling than a second material, the second material being more mechanically robust than the first material; and a second surface-plasmonic plate formed of the second material and located on the bottom surface of the first surface-plasmonic plate, a lower edge of the second surface-plasmonic plate extending closer to the media-facing surface than the first surface-plasmonic plate, the second surface-plasmonic plate comprising a peg that extends from the lower edge to the media-facing surface, an upper edge of the second surface-plasmonic plate slanted in a downtrack direction.

2. The write head of claim 1, wherein overlapping portions of the first and second surface-plasmonic plates have a same, in-plane, crosstrack edge shape.

3. The write head of claim 2, wherein the crosstrack edge shape comprises a parabolic shape.

4. The write head of claim 1, wherein the first material comprises at least one of Au, Au-Alloy, Ag, and Cu.

5. The write head of claim 1, wherein the second material comprises at least one of Rh, Ir, nitrides (TiN, TaN), Pt, and Pd.

6. The write head of claim 1, further comprising first and second optical side shields on first and second crosstrack sides of the first and second surface-plasmonic plates, the first and second optical side shields elongated and slanted relative to the media-facing surface in a crosstrack direction.

7. The write head of claim 1, wherein the waveguide core narrows in a crosstrack direction as it approaches the media-facing surface.

8. The write head of claim 1, wherein a terminating edge of the waveguide core has a slanted surface that faces away from the write pole, the write head further comprising a funnel coupler spaced away from the slanted surface and having a reflective surface parallel to the slanted surface.

9. The write head of claim 1, wherein the upper edge of the second surface-plasmonic plate is slanted between 20 and 70 degrees relative to a bottom surface of the second surface-plasmonic plate.

10. A write head comprising:
a waveguide core;
a magnetic pole; and
a near-field transducer comprising stacked and partially overlapping first and second plasmonic plates between the waveguide core and the magnetic pole, the first surface-plasmonic plate facing the magnetic pole and the second plasmonic plate facing the waveguide core, the first plasmonic plate recessed further from a media-facing surface of the write head than a lower edge of the second plasmonic plate, the first surface-plasmonic plate formed of a first material having lower-loss in plasmonic coupling than a second material used to form the second surface plasmonic plate, the second surface-plasmonic plate comprising a peg that extends from the lower edge, an upper edge of the second surface-plasmonic plate slanted at an angle relative to the waveguide core.

11. The write head of claim 10, wherein the second material is more mechanically robust than the first material.

12. The write head of claim 10, wherein overlapping portions of the first and second surface-plasmonic plates have a same, in-plane, crosstrack edge shape.

13. The write head of claim 12, wherein the crosstrack edge shape comprises a circular shape.

14. The write head of claim 10, further comprising first and second optical side shields on first and second crosstrack sides of the first and second surface-plasmonic plates, the first and second optical side shields elongated and slanted relative to the media-facing surface in a crosstrack direction.

15. The write head of claim 10, wherein the waveguide core narrows in a crosstrack direction as it approaches the media-facing surface.

16. The write head of claim 10, wherein a terminating edge of the waveguide core has a slanted surface that faces away from the write pole, the write head further comprising a funnel coupler spaced away from the slanted surface and having a reflective surface parallel to the slanted surface.

17. The write head of claim 10, wherein the upper edge of the second surface-plasmonic plate is slanted between 20 and 70 degrees relative to a bottom surface of the second surface-plasmonic plate.

18. A method comprising:
coupling light into a waveguide core that delivers the light proximate to a media-facing surface of a write head;
coupling the light from the waveguide to a first surface-plasmonic plate proximate a magnetic pole and recessed from the media-facing surface of the write head, the light generating surface-plasmon polaritons on a bottom surface of the first surface-plasmonic plate, the bottom surface facing away from the magnetic pole and towards the waveguide core, the first surface-plasmonic plate being formed of a first material having lower-loss in plasmonic coupling than a second material, the second material being more mechanically robust than the first material; and
couple the surface-plasmon polaritons from the bottom surface of the first surface-plasmonic plate to a second surface-plasmonic plate formed of the second material and located on the bottom surface of the first surface-plasmonic plate, a lower edge of the second surface-plasmonic plate extending closer to the media-facing surface than the first surface-plasmonic plate and having a peg that extends from the lower edge and directs the surface-plasmon polaritons out of the media-facing surface towards a recording medium.

19. The method of claim 18, wherein the light is coupled to the waveguide in a fundamental transverse magnetic mode.

20. The method of claim 18, further comprising applying a magnetic field to a hotspot on the recording medium formed by the surface-plasmon polaritons, the magnetic field recording data to the hotspot.

* * * * *